United States Patent [19]
Bradbury et al.

[11] Patent Number: 5,035,061
[45] Date of Patent: Jul. 30, 1991

[54] GUIDE FOR HAND-HELD POWER TOOLS

[76] Inventors: Timothy Bradbury, 239 Gainsborough Rd.; Andrew Parker, 14-109 Niagara St., both of Toronto, Canada

[21] Appl. No.: 459,515

[22] Filed: Jan. 2, 1990

[51] Int. Cl.⁵ .......................... B27B 9/04; B43L 13/02
[52] U.S. Cl. .......................................... 33/430; 33/42; 30/373; 83/745
[58] Field of Search ................. 33/430, 437, 403, 427, 33/429, 474, 479, 42–44, 626, 630, 640; 30/371, 373; 83/745, 468

[56] References Cited

U.S. PATENT DOCUMENTS

| | | |
|---|---|---|
| 2,529,210 | 11/1950 | Butler . |
| 2,651,333 | 7/1953 | Spinney ................................. 33/430 |
| 2,942,633 | 6/1960 | King . |
| 3,296,702 | 1/1967 | Feddish . |
| 3,927,475 | 12/1975 | Chang ................................ 30/373 |
| 4,128,940 | 12/1978 | Ong ..................................... 83/745 |
| 4,202,233 | 5/1980 | Larson . |
| 4,483,071 | 11/1984 | te Kolste ............................... 33/42 |
| 4,522,098 | 6/1985 | Bliss . |
| 4,628,608 | 12/1986 | Kuhlmann et al. ................... 30/373 |
| 4,751,865 | 6/1988 | Buckalew . |

Primary Examiner—Harry N. Haroian
Attorney, Agent, or Firm—Zarley, McKee, Thomte, Voorhees & Sease

[57] ABSTRACT

This invention provides a guide for hand held power tools for use in cutting sheet material and the like, comprising a T-square having a straight edge adapted to abut the edge of sheet material and an arm extending normal thereto across the sheet material having a hinged base plate capable of being fastened at adjustable locations along the arm at measured dimensions from the straight edge. Power tools, such as circular saws or routers, may be mounted on the base plate which is pivotal between a raised position in which the power tool is out of engagement with the sheet material and a lower position in which the cutting tool engages the material.

3 Claims, 3 Drawing Sheets

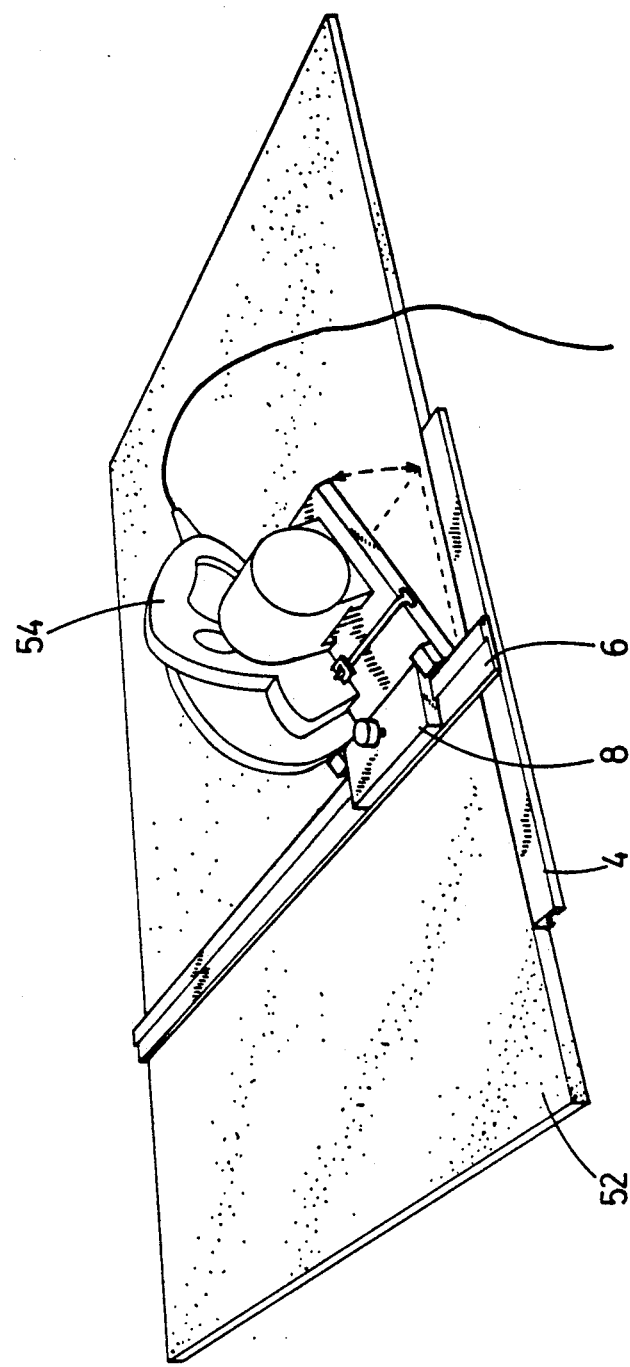
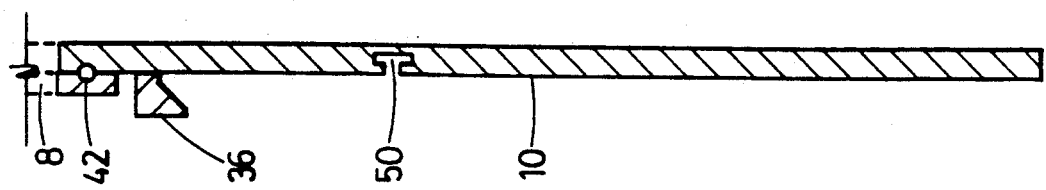
FIG. 7
FIG. 6

GUIDE FOR HAND-HELD POWER TOOLS

This invention relates to an improved guide mechanism for power tools. In particular, it relates to a guide mechanism which permits the use of hand held power tools for the purpose of making accurate cuts in large work pieces such as sheet material.

The increased use of new composite construction materials, such as plywood particle board, fibre boards and plastic laminates, and the current popularity of home renovations has created a need among carpenters and builders for means to make accurate cuts in large sheet material, preferably on the job site.

Traditionally, this sort of work has been done in a workshop setting with the aid of large machines such as table saws and planners or edgers. It is inconvenient, however, to use these machines at a site remote from the job without the ability to adjust dimensions to fit the installation. It is also difficult and inconvenient to move such large machines from job site to job site and in any event there is often not enough room to install and use them. Furthermore, these machines require that large work pieces or sheet material must be handled by two or more people and moved during the cutting operation.

Large floor mounted machines require costly shop space and are too expensive to be provided at several job sites where a contractor may have operations ongoing.

For rough carpentry work on small pieces, such as two by fours, hand power tools, such as rotary saws and sabre saws, may be used, but they are not accurate enough and do not provide a sufficiently fine finish for such things as built in cabinets, kitchen cupboards, door trim and the like.

In the past, previous devices have been invented for the purpose of providing a guide for small power tools or hand tools so as to make them more accurate. However, most of these devices are directed solely to the purpose of providing a straight cut in sheet material. Many of them are cumbersome and awkward to use and most lack the versatility and adaptability which would allow them to be sufficiently useful on the job site.

It is, therefore, the purpose of this invention to provide a device which will enable a builder or carpenter to make better use of hand tools such as a circular saw or router. It is also a purpose of this invention to provide a device which will allow such hand tools to be used to make straight or otherwise accurate cuts in sheet material and lumber.

It is additionally the purpose of this invention to provide a device which is small, light, transportable and convenient for use on the job site.

It is also the purpose of this invention to provide a device which will make the use of hand tools easier and more versatile in the cutting of sheet material such as plywood, plastic laminates, wallboard, marble, granite and multiple cuts in large stock material etc.

These and other objects may be accomplished by a guide for hand held power tools used for cutting sheet and stock material, which guide comprises a T-square having a straight edge adapted to abut against and run along the edge of said material, an arm mounted on top of said straight edge and extending normal thereto and adapted to rest across the top of the said material, a shoe mounted to move along said arm and capable of being fixed at adjustable locations thereon at selected distances from said straight edge, a base plate hinged to said shoe and pivotal between a lower position overlaying said material and an upper position raised above said material, and means to clamp power tools on said base plate. The guide is so designed that the cutting edge of the power tool will project below the base plate and engage the material when the base plate is pivoted to the lower position and will be raised out of engagement with the material when the base plate is pivoted in the raised position.

The nature and operation of the invention may be better understood by the following description of one embodiment thereof with reference to the drawings in which FIG. 1 is a plan view of a guide constructed in accordance with the present invention;

FIG. 6 is a cross sectional view of a portion of the guide as illustrated in FIG. 4;

FIG. 7 is a perspective view of the guide, illustrating one application thereof.

Figure 1:
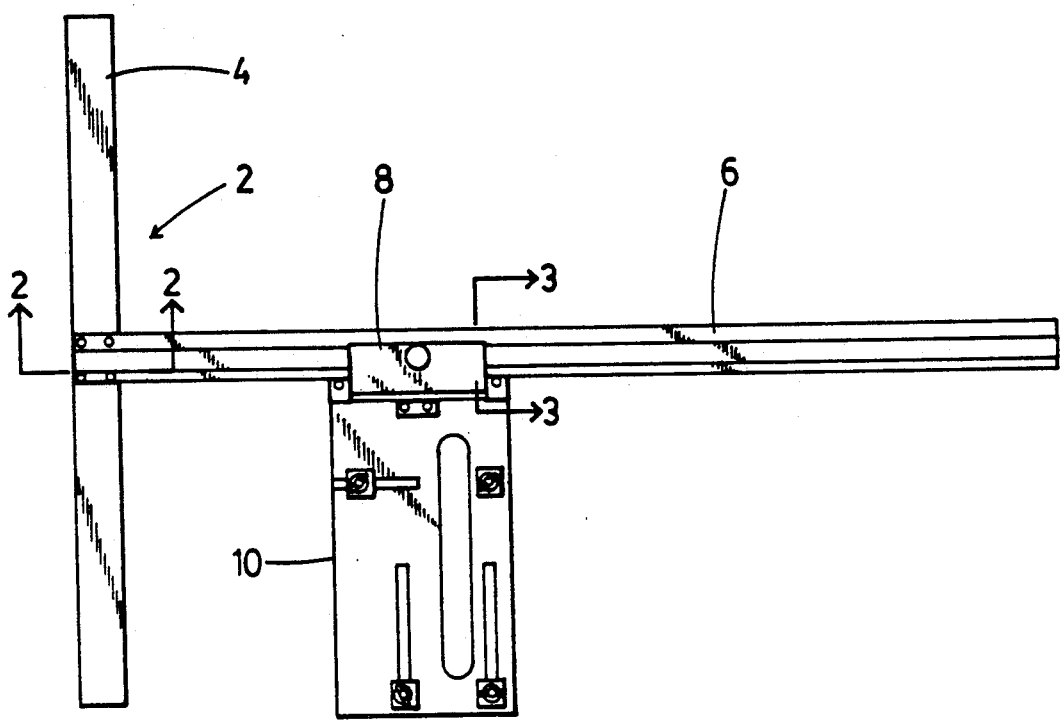

The illustrated embodiment, best seen in FIG. 1, comprises a T-square 2 with a straight edge section 4 and an arm 6 extending perpendicularly and rigidly fastened on top of the straight edge section 4 at a point approximately near but not necessarily precisely the mid point of the straight edge.

Mounted on the arm 6 is a shoe 8 capable of moving along substantially the entire length of the arm 6 and adapted to be fastened at any selected location thereon.

Pivotally fastened to the shoe 8 is a base plate 10 adapted to secure a cutting tool thereon and hinged to pivot about an axis parallel to the arm 6.

Figure 2:
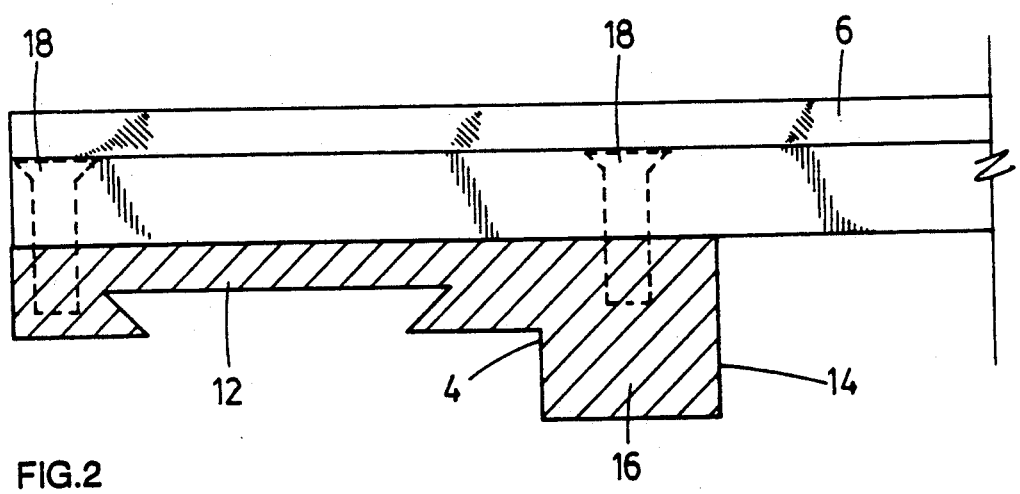
FIG. 2 is a cross sectional view of a portion of the guide through the line 2—2 in the embodiment shown in FIG. 1.

FIG. 2 illustrates, in cross section, the detail of the straight edge section 4 which is mounted perpendicular to the arm 6 and has a horizontal flange 12 which provides lateral rigidity to maintain the straightness of the straight edge 14 which is designed to abut against and ride along the edge of a work piece of sheet material and provide a reference point from which the cutting edge of the power tool is measured or positioned.

The straight edge piece 4 also has a vertical flange 16 which provides some vertical rigidity to the straight edge 4 but is also designed to fit within a dado cut to provide a positive guide for the spacing between shelves in a bookcase or the like where measurement is not made from the edge of the material. Also illustrated are machine screws 18 which fasten the straight edge section and the arm 6 together.

Figure 3:
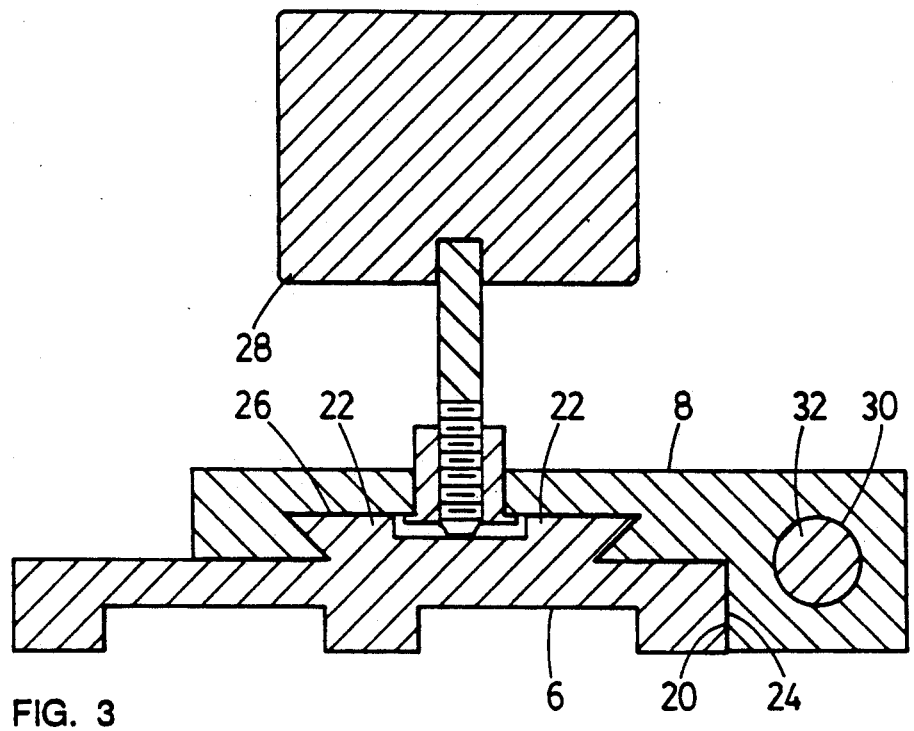
FIG. 3 is a cross sectional view of a portion of the guide along the line 3—3 of the embodiment shown in FIG. 1.

FIG. 3 illustrates, in cross section, the details of the arm 6 and the shoe 8. The arm 6 is provided with an edge 20 and a key 22 which runs longitudinally along the top of the arm.

The shoe 8 is provided with a stop 24 designed to engage the edge 20 and a key way 26 which fits over the key 20. Thus, by the aforementioned configuration, the shoe is adjustably fastened onto the arm 6 to prevent movement perpendicular to the arm but may be moved along the length thereof to be fixed at a desired location measured from the straight edge, by means of the set screw 28.

Adjacent to one edge of the shoe 8 is a bore 30 adapted to receive a pin 32 which forms the axis of rotation for the hinge of the plate 10.

Figure 4:
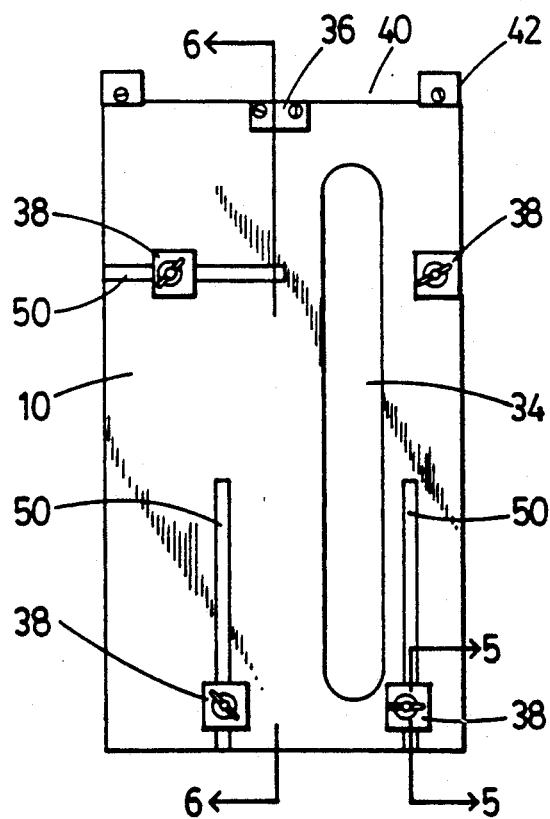
FIG. 4 is an enlarged view of a portion of the guide shown in FIG. 1.

FIG. 4 illustrates in plan view the details of the base plate 10 shown in FIG. 1. This base plate is intended to provide means for mounting a power cutting tool such as a hand held circular saw or router. The plate is provided with a longitudinal gap 34 through which the saw blade or bit of the power tool may project to engage and cut the surface of a work piece of sheet material below. The base of the power tool rests on the plate 10 and preferably is positioned into engagement with the undercut notch 36 at the forward end of the base plate. The tool is then fixed in position by means of the clamps which are all similar and referred to by reference numeral 38 which hold the base of the tool onto the plate in fixed position against the notch 36 with the blade or bit protruding through the gap 34. The plate has a central recess 40 with extending lugs 42 at each side which are adapted to receive the same pin 32 which protrudes through the bore 30 in the shoe 8, thus providing a hinge by which the plate 10 is pivotally fastened to the shoe 8, which is positioned within the recess 40 as shown in FIG. 1.

Figure 5:
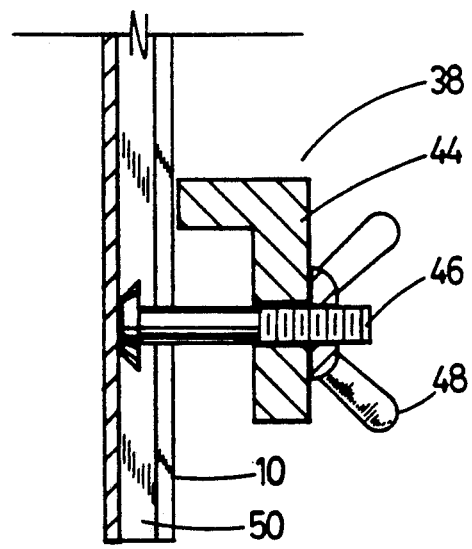
FIG. 5 is a cross sectional view through the line 5—5 of the embodiment shown in FIG. 4.

The clamps 38 are illustrated in greater detail in FIG. 5 and comprise a jaw 44 which can be tightened on the base of a power tool by means of the bolt 46 and wing nut 48. To avoid any obstruction on the underside of the plate 10, the head of the bolt 46 is slidably engaged within a cavity 50 which is best illustrated in cross section in FIG. 6. The bolts, and therefore the clamps 38, can be moved along these recesses to whatever position is required to engage the base of the power tool which can then be clamped in place by tightening the wing nuts 48.

FIG. 6 illustrates in longitudinal section the base plate 10, the clamp bolt cavity 50, the recessed notch 36, and the hinge lugs 42 which are pivotally fastened to the shoe 8.

Thus, the embodiment illustrated and referred to above, provides a straight edge section 4 with a straight edge 14 which is designed to abut against the side edge of a piece of sheet material and move lengthwise along the edge of the material no matter how long it may be. The arm 6 extends perpendicularly from the straight edge across the top of the sheet material. Ideally, it should have along it's leading edge, markings representing inches or centimeters and divisions thereof to mark the distance from the straight edge 14. The shoe 8 may be inserted over the ledge 20 and key 22 to slide along the length of the arm 6 to any desired location where it may be fixed by the set screw 28. A cutting tool, such as a circular saw or router, can be mounted on the base plate 10 and fixed by the clamps 38 so that the blade or bit extends the required distance below the base of the plate through the gap 34, depending on whether the work requires that the material be cut through or merely recessed.

Because the device is reasonably light and easy to handle, it may be removed to the floor or a workbench for the purpose of mounting a power tool to the base plate. Thereafter, with the base plate hinged upwards, the guide may be placed on the work material with the straight edge against one side and the arm 6 lying flat on the top (all without damaging the work piece by the tool blade or bit). The appropriate dimension or location for the cut may be measured by the ruler on the forward edge of the arm 6 (or by other means) and the shoe 8 may be moved longitudinally on the arm until the blade or bit is positioned at the desired dimension and the shoe can be clamped in place relative to the straight edge and the edge of the work piece. With the base plate and power tool pivoted upward in the raised position, such as illustrated in FIG. 7, the power tool 54 may be started and then lowered into gradual engagement with the sheet material 52 until the base plate rests on the top thereof. If a long, horizontal cut is desired, the T-square is simply moved along the entire length of the work piece.

However, if a shorter cut is desired, the saw or router may be positioned above the portion of the work that is to be cut, lowered into engagement, moved the length of the cut desired and then raised again to withdraw it from the work piece. Thus, smaller cuts, such as required where an opening is cut in a counter top for a sink, may be easily provided.

Because the power tool is rigidly mounted to the guide, it provides some security and stability against the danger of slippage or mishandling which might cause damage to the work piece or injury to a workman. Furthermore, the base plate may be hinged up to the vertical position where the weight of the power tool hanging forward of the hinge will keep the tool and the base plate in the upright position while the guide is moved to the next location.

Because the straight edge 14 is of a substantial length and substantially rigid, it will be effective even where the edge of a work piece is curved or undulating and will serve to provide a cut edge which is relatively much more straight. A second cut, made from that edge, will provide a work piece from which the warp or curvature is almost completely eliminated.

Although the illustrations show cuts made a fixed distance from the edge of a sheet of material, it will be realized that angled cuts can be made by clamping an auxiliary straight edge parallel to the desired cut and using the device with the straight edge 14 abutting the auxiliary straight edge to make the angled cut. This combination may also be used where the edge of sheet or stock material is warped or uneven.

Although the invention is not restricted to particular materials or dimensions, it may be helpful to those skilled in the art to know that aluminum has been found to provide the requisite degree of rigidity and desirable lightness. In a prototype which was found to be workable, the straight edge 4 was approximately 30 inches long, 2 inches wide and a half inch thick; the arm 6 was approximately 50 inches long and 2 inches wide; the base plate 10 was about 14 inches long and 9 inches wide.

With a device, such as that desired above, a builder or carpenter may make a variety of cuts with different tools in an assortment of material. At the same time, the device provides some of the precision of a table saw with the convenience and portability of a hand tool.

It will, of course, be realized that modifications and variations of the illustrated embodiment may be employed without departing from the inventive concept herein.

I claim:

1. A guide for hand held power tools having a cutting tool used for cutting sheet and stock material having an edge comprising:

a straight edge section adapted to abut against and move along the edge of said material;

an arm section mounted on top of and extending substantially perpendicular from said straight edge section;

a shoe mounted on said arm section and fastened against movement perpendicular to said arm section and being adapted for movement along said arm, with means to fix said shoe at selected locations thereon;

a base plate fastened at one end by hinge means to said shoe and pivotal about said hinge means between a lowered position in substantially the same plane as said arm section and a raised position above said plane;

means to fasten a power tool on the upper surface of said base plate so that the cutting tool of said power tool extends below the bottom surface of said base plate.

2. A guide, as claimed in claim 1, in which said straight edge section has a downwardly extending flange.

3. A guide, as claimed in claims 1 or 2, in which said shoe is mounted for movement along said arm section by means which include a keyway in one of said arm section or said shoe and a key receivable in said keyway in the other.

* * * * *